United States Patent [19]

Mikina

[11] Patent Number: 4,738,466
[45] Date of Patent: Apr. 19, 1988

[54] VEHICLE SUSPENSION

[76] Inventor: Stanley J. Mikina, 4782 Coquina Key Dr., St. Petersburg, Fla. 33705

[21] Appl. No.: 926,552

[22] Filed: Nov. 4, 1986

[51] Int. Cl.$^4$ .............................................. B60G 1/00
[52] U.S. Cl. ..................................... 280/688; 280/675
[58] Field of Search ............... 280/679, 788, 772, 675, 280/676, 688, 689

[56] References Cited

U.S. PATENT DOCUMENTS

| | | | |
|---|---|---|---|
| 4,341,397 | 7/1982 | Morimura et al. | 280/688 |
| 4,373,743 | 2/1983 | Parsons, Jr. | 280/675 X |
| 4,515,390 | 5/1985 | Greenberg | 280/675 |
| 4,522,418 | 6/1985 | Struck et al. | 280/675 X |
| 4,545,662 | 10/1985 | Shibahata | 280/675 X |
| 4,603,881 | 8/1986 | Mikina | 280/675 |

FOREIGN PATENT DOCUMENTS

| | | | |
|---|---|---|---|
| 210764 | 8/1960 | Austria | 280/688 |
| 823102 | 11/1951 | Fed. Rep. of Germany | 280/688 |

*Primary Examiner*—James T. McCall
*Attorney, Agent, or Firm*—William J. Ruano

[57] ABSTRACT

In a vehicle comprising sprung and unsprung masses, rollout of the sprung mass on its support springs and away from the unsprung mass due to centrifugal force on the sprung mass in turns is eliminated and free independent movement of the wheels is permitted by pivoting the sprung mass at two locations on an axis passing through the center of gravity of the sprung mass and lying in a plane parallel to the centrifugal force vector. The centrifugal force acting on the center of gravity of the sprung mass has no direct overturning moment around this pivot axis. The resulting centrifugal force component on each axis pivot is transmitted to the wheels and ground without producing any rollout deflections of the main vehicle support springs. In particular the pivot force at the critical rear suspension is conveyed directly to ground by means of two independent torque tubes and torque arms. The anti-roll torsion bar is eliminated and softer body support springs may be used for improved isolation of road shocks and vibrations from the sprung mass.

5 Claims, 4 Drawing Sheets

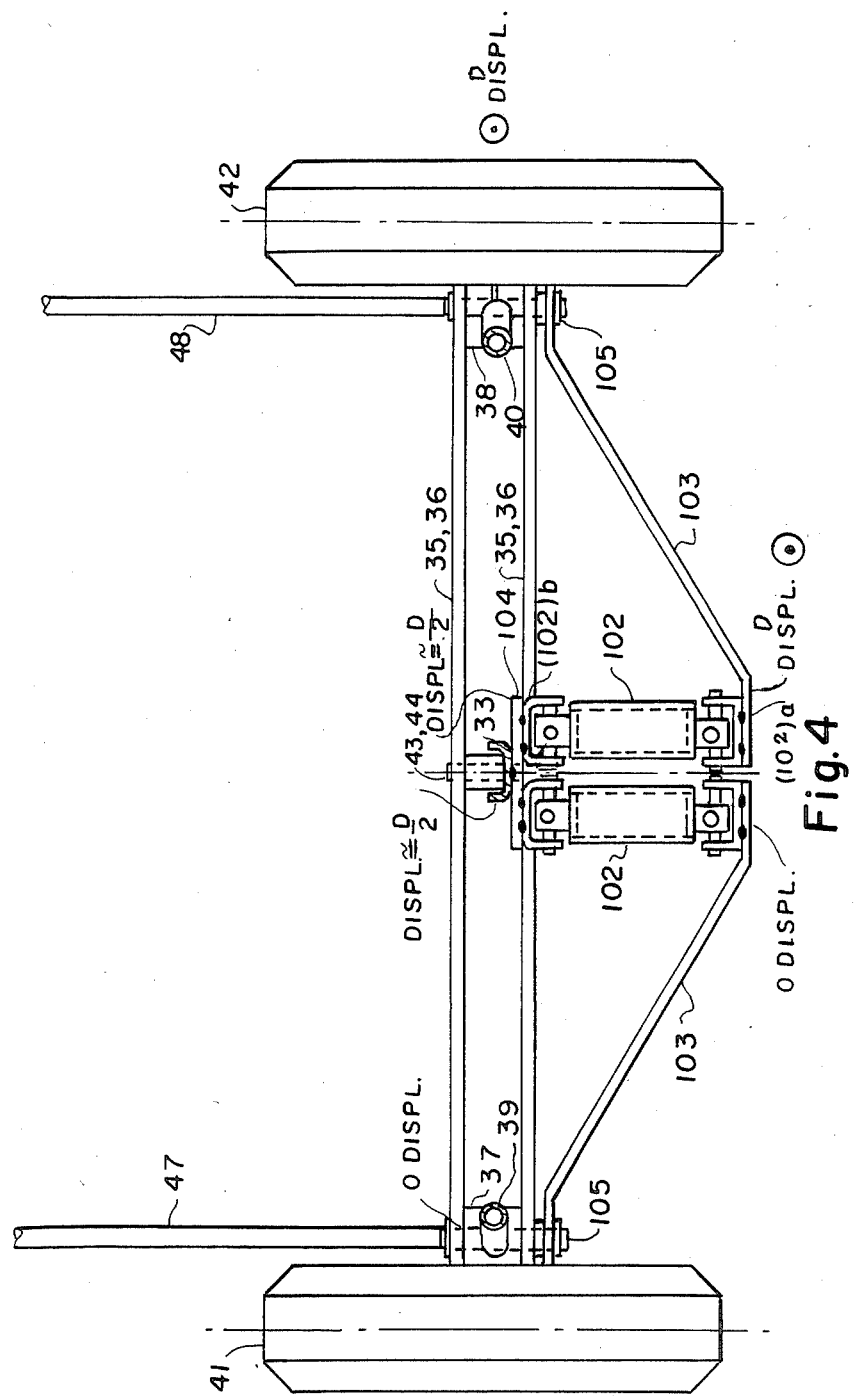

VEHICLE SUSPENSION

This invention relates to a vehicle suspension and is an improvement over that covered by my U.S. Pat. No. 4,603,881 dated Aug. 5, 1986.

BACKGROUND OF THE INVENTION

In order to isolate the occupants or other contents of a vehicle from road shocks and vibrations, that part of the vehicle weight which consists of the vehicle body, frame and engine plus transmission is supported on the axles and wheels or springs having a low rate or force/deflection characteristic. Such comparatively soft springs are particularly necessary on vehicles with high pressure radial tires whose own isolation function is greatly reduced by their high effective spring rate.

However, the use of soft vehicle support springs gives rise to another problem, namely excessive body rollout due to the centrifugal force acting on the spring mass in sharp turns. In such turns, the comparatively high centripetal acceleration $V^2/R$ of the sprung mass (vehicle velocity V, path radius R) requires large rollout sprung deflections to make the sprung mass follow the path of unsprung mass during the turn. Such large rollouts are undesirable because of passenger discomfort and because they can lead to loss of vehicle control.

It is an object of this invention to eliminate rollout without the use of an anti-roll torsion bar and without hydraulic cylinder biasing. A further object of this invention is to provide independent springing at all four wheels for superior road disturbance isolation from the sprung mass.

SUMMARY OF THE INVENTION

In accordance with the teachings of this invention, vehicle rollout in turns is eliminated by pivoting the vehicle sprung mass on an axis that lies in a plane that intersects the center of gravity of the sprung mass, with said plane being normal to the verticle plane of the side elevation of the vehicle. An important corollary of this criterion is that the centrifugal turn forces on the axis pivots must bypass the vehicle support springs and go directly to ground through the axles and wheels.

The anti-roll system is applicable to either front or rear drive vehicles. The present disclosure describes a front wheel drive embodiment.

BRIEF DESCRIPTION OF THE DRAWINGS

For a better understanding of this invention, reference is made to the drawings and following description, in which:

FIG. 4 is a sectional view taken along line 4—4 of FIG. 1 and line 4—4 of FIG. 3.

DESCRIPTION OF THE PREFERRED EMBODIMENT

Figure 1:
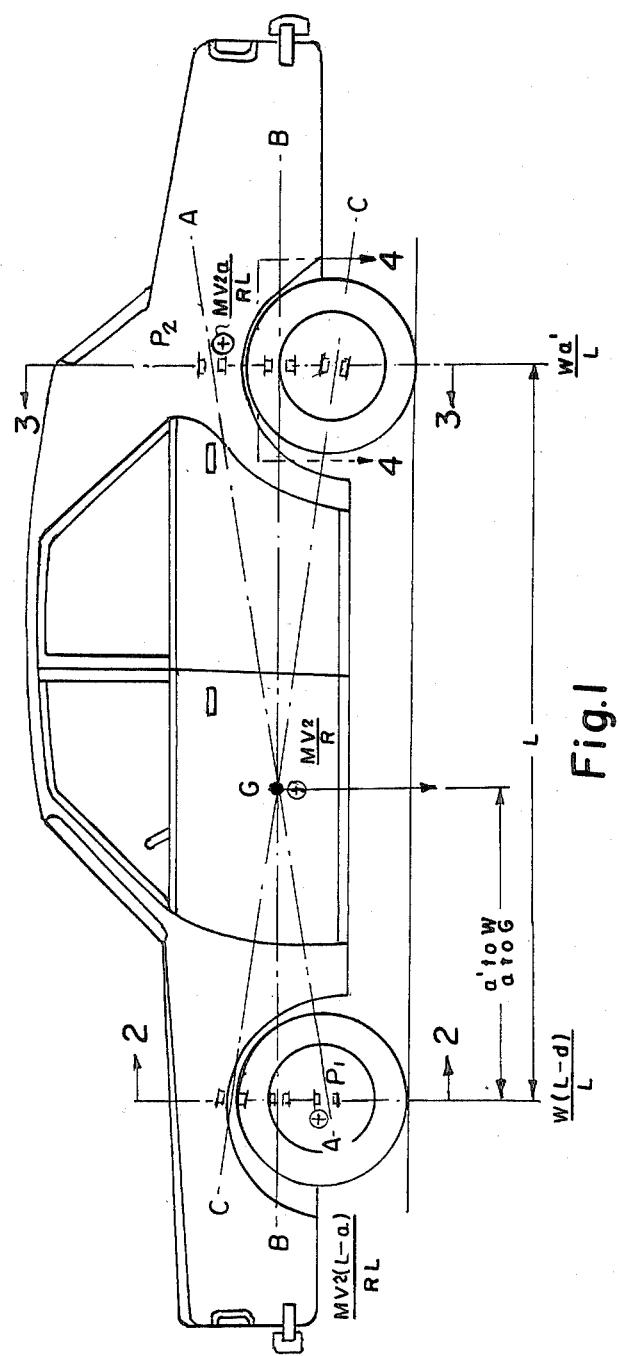
FIG. 1 is a side view of a vehicle showing a distribution of forces.

FIG. 1 is a view in side elevation showing a vehicle with the slanted anti-roll axis A—A lying in a plane passing through the center of gravity G of the sprung mass, and with the front axis pivot $P_1$ in a vertical plane through the front axles, while the rear axis pivot $P_2$ lies in a vertical plane through the rear axles. Also shown is the centrifugal force acting on G in a turn and its division into forces at the front and rear pivots $P_1$ and $P_2$. Since G is in the plane of the pivot axis A-A, the centrifugal force in this plane in a turn has no turning movement on the vehicle body and can produce no rollout.

Figure 2:
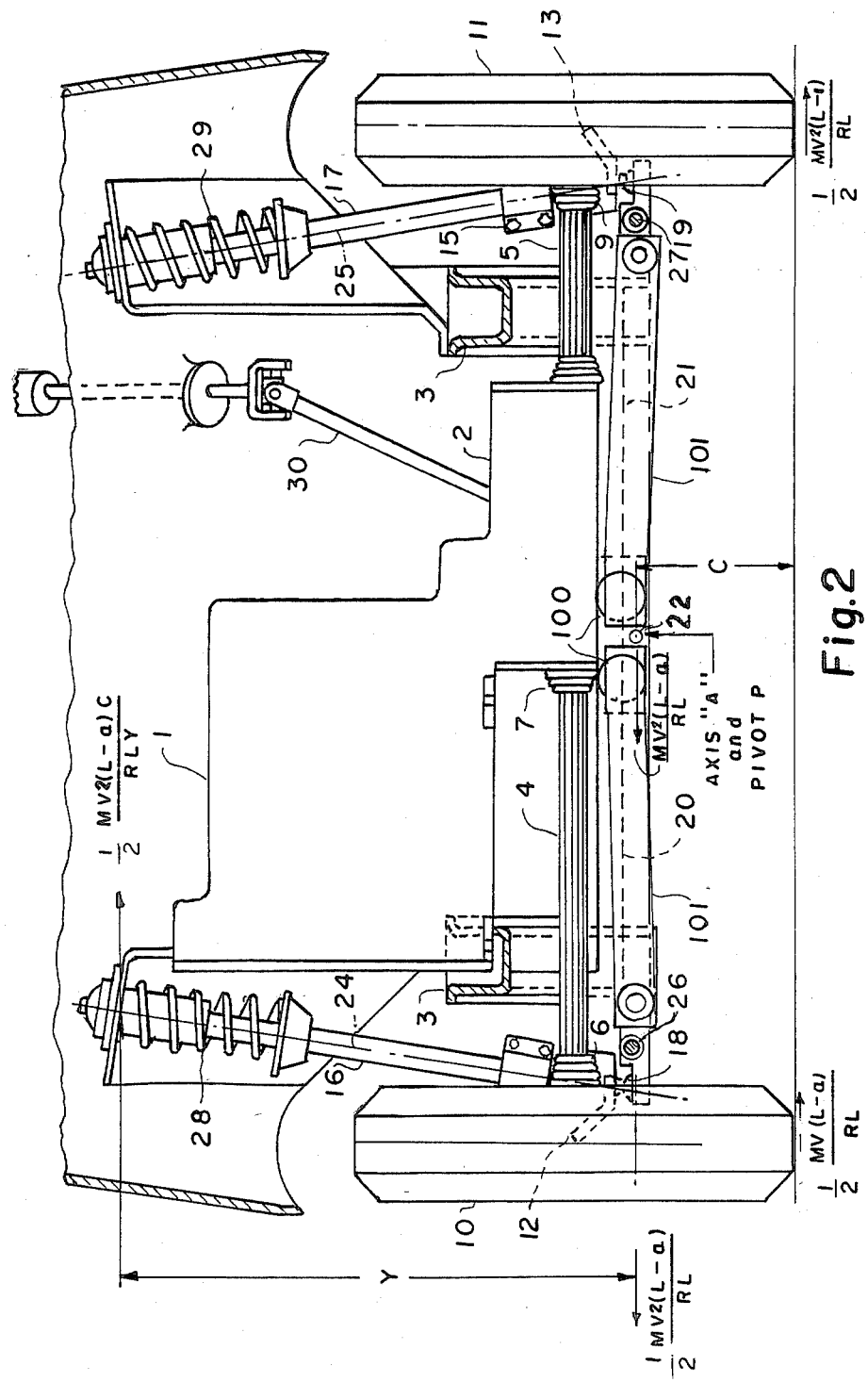
FIG. 2 is a sectional view taken along line 2—2 of FIG. 1.

FIG. 2 is a view in front elevation showing the front pivot $P_1$ of the anti-roll axis mounted on the vehicle transaxle housing and connected to the wheel struts by single control arms which are attached to a ball joint on the steering knuckle on the MacPherson strut axis. Also shown are the centrifugal force component on pivot $P_1$ and the equilibrating reaction forces at the vehicle wheels and ground. Pivot $P_1$ is preferably midway between the front wheels for symmetry in the wheel control bars.

Figure 3:
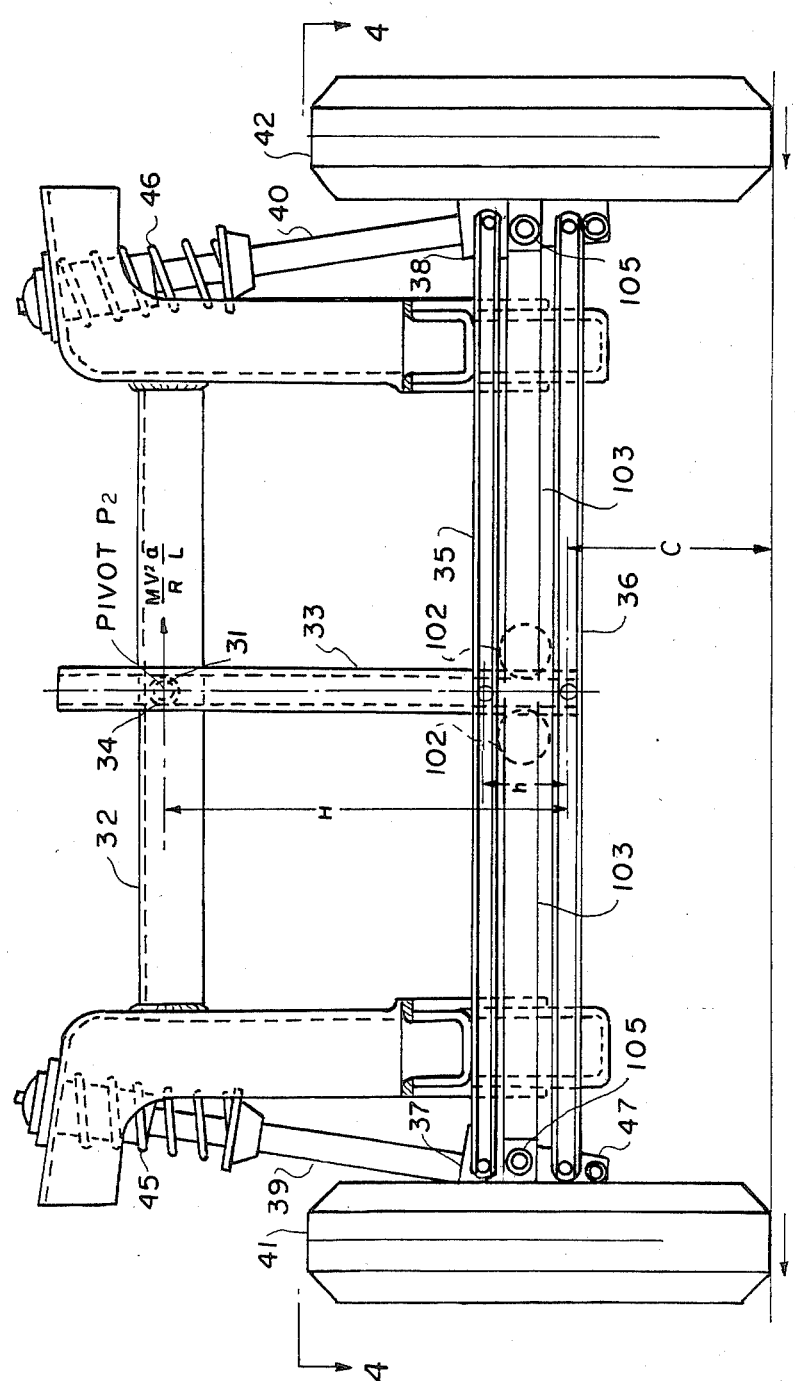
FIG. 3 is a sectional view taken along line 3—3 of FIG. 1.

FIG. 3 is a view in rear elevation showing the rear pivot $P_2$ of the anti-roll axis A—A and the centrifugal component acting on this pivot in a turn. The pivot $P_2$ is rigidly attached to a frame cross-member and supports a grommeted roller that engages a vertical channel member. The lower end of this channel is rotatably pinned to two horizontal bars that form a displaceable parallelogram with their pinned connections to the lower support body of the wheel struts. Also shown are the equilibrating reaction forces at the vehicle wheels and ground. The vertical channel engaging pivot $P_2$ permits unimpeded vertical displacement of the rear wheels either singly or in unison with no loss of centrifugal restraint. $P_2$ is peferably in a vertical plane midway between the rear wheels.

To prevent collapse of the displaceable parallelogram by the $P_2$ pivot force, the lower end of the vertical channel member is also connected to two separate and independent torque tubes with torque arms attached to grommets on the lower support body of the wheel struts.

FIG. 4 is a view in top elevation of the rear suspension, showing the torque tubes with universal joints at each end for attachment to the vertical channel member at one end and to the torque arms at the other.

DETAILED DESCRIPTION OF THE PREFERRED EMBODIMENTS

The anti-roll suspension is shown in FIGS. 1 through 4 as applied to a front wheel driven passenger vehicle having a sprung mass M and a total vehicle weight W. In a turn, the centrifugal rollout force acts as if all of the sprung mass M were concentrated at its center of gravity G. This is located at a horizontal distance "a" from the front axle, while the center of gravity of the total vehicle weight W is located at a horizontal distance a' from the front axle. a' is usually somewhat greater than "a". The resultant centrifugal force $MV^2/R$ on the sprung mass acts at G into the plane of the side elevation of FIG. 1 for a left turn, for example.

To prevent rollout, the sprung mass is suspended on an axis A—A which lies in a plane enormal to the vertical plane of the side elevation, FIG. 1, and intersects the center of gravity G and the front axle at $P_1$. The prolongation of this plane from $P_1$ through G establishes the location of the rear pivot $P_2$ on a vertical line through the rear axle.

The resultant centrifugal force $MV^2/R$ at G is distributed between the two pivots, with $$\frac{MV^2(L-a)}{RL}$$

going to the front pivot and $MV^2a/RL$ going to the rear pivot, where L is the vehicle wheel base.

The front suspension geometry of a typical front wheel driven vehicle is shown in FIG. 2. The transversly mounted engine 1 and transmission plus differential 2 are supported on vehicle frame 3. The drive axles 4,5 projecting from the differential housing are connected by means of constant velocity universal joints 6,7,9 to the front wheels 10,11 through splines in the partially shown steering knuckles 12, 13. The steering knuckles are part of the lower support members 14,15 of the suspension struts 16,17.

The sprung vehicle weight $$\frac{Mg(L-a)}{L}$$

is transmitted to the wheels and ground through support springs 28,29, then through struts 16,17, and finally through the rigid connection of the steering knuckles to the wheel hubs. For lateral stability the lower arms 12,13 of the steering knuckles are attached through ball joints 18,19 to control bars 20,21 that link the front wheel drive and steering assembly to the front pivot $P_1$ on the vehicle frame. Pivot $P_1$ is established by means of a pin 22 engaging a bracket 23 joined to the defferential housing 2. Ball joints 18,19 are in line with the steering axes 24,25 of the wheel struts for unimpeded steering displacements of the front wheels. Longitudinal stability of the drive and steering assembly is provided by means of tie rods 26,27 that extend from the wheet ends of control bars 20,21 to the vehicle frame forward of the front axles. The ends of these tie rods are rubber grommeted to improve the geometry for vertical or lateral displacements of the wheels.

The component of the sprung mass centrifugal force acting on pivot $P_1$, namely $$\frac{MV^2(L-a)}{RL},$$

is transmitted via pin 22 to the lateral control bars 20,21 and thence to the wheels through ball joints 18,19. The distribution of this force between these two bars is not uniquely determinable because of the lateral tire flexibility and because of the changeable friction forces between tires and road. One possible distribution is illustrated in FIG. 2. There, the centrifugal force $$\frac{MV^2(L-a)}{RL}$$

is equally divided between control bars 20,21. The result is that the control bar 20 force $$\frac{\frac{1}{2}MV^2(l-a)}{RL}$$

on the left wheel of the figure is equilibrated by an equal and opposite friction force acting between the wheel and ground.

There is also an overturning couple on the wheel due to the control bar force and its ground reaction friction force. In my first patent on this subject, U.S. Pat. No. 4,603,881, I postulated that the overturning wheel couple would be balanced by a counter couple due to the weight component on the wheel and its ground reaction force being displaced from the weight line of action by some small horizontal distance. Further study has shown that the counter couple due to these forces would be too small to cope with all but the smallest centrifugal forces. This deficiency has been corrected by means of two independent torque tubes 100 and torque arms 101 that equilibrate the couples on the wheels and on the vehicle body by means of vertical forces at the wheel hubs and their ground reactions.

For example, in the present case the overturning couple on the left wheel equal to $$\frac{\frac{1}{2}MV^2(L-a)C}{RL}$$

is balanced by a horizontal force equal to $$\frac{\frac{1}{2}MV^2(L-a)C}{RLY}$$

acting at the top of strut 16 and at a height Y above control rod 20. The equal and opposite reaction force acting on the vehicle body at that point causes an overturning couple on the vehicle body that is just equal to the overturning couple on the wheel. So what has been gained? Simply this: The overturning couple on the vehicle body can now be equilibrated by two independent torque tubes and torque arms acting between the vehicl body and the wheel hubs, with the important distinction that the torque arm forces on the wheel hubs are vertical and produce only vertical ground reactions.

The overturning couple on the right wheel due to its bar 21 force results in the same system of forces. It is now apparent that the distribution of the centrifugal force at pivot 1 between bars 20 and 21 is immaterial to the final result. More details on the torque tubes and torque arms at the front suspension will come to light when we analyze a a similar set of circumstances in the rear suspension, as depicted in FIGS. 3 and 4.

The rear suspension geometry of this front wheel driven vehicle is shown in FIGS. 3 and 4. The problem to be solved there is to establish a pivot point $P_2$ that is considerably above the rear axles on slanted axis A—A and that permits vertical displacements of the rear wheels on their support springs without any significant change in wheel tread in spite of the elevated pivot. This is accomplished as follows:

Pivot $P_2$ is established by means of a pin 31 projecting from a frame cross-member 32 and in line with slanted axis A—A substantially halfway between the wheels. Pin 31 engages a vertical channel member 33 by means of a roller 34 that is guided vertically by side flanges of said channel. The lower end of 33 is rotatably pinned to the horizontal lateral control bars 35, 36 whose ends in turn are rotatably pinned (FIG. 3) to the clamp members 37,38 of the wheel struts 39, 40.

In FIG. 3, the sprung vehicle weight Mga/L, where g is the acceleration of gravity, is transmitted to the wheels and ground through support springs 45, 46; through struts 39, 40; and through the rigid connection of strut clamping members 37, 38 to the wheel hubs. Lateral stability of the wheels relative to the vehicle frame is provided by lateral control bars 35, 36 in conjunction with vertical channel 33, pivot $P_2$, and separate and independent torque tubes 102 and torque arms 103. Longitudinal stability of the rear suspension assembly is provided by means of tie rods 47, 48 (FIG. 4) that extend from strut hubs 37, 38 to the vehicle frame forward of the rear axles. The ends of these tie rods are rubber grommeted to improve the geometry for vertical or lateral displacements of the wheels.

The component of the sprung mass centrifugal force acting on Pivot $P_2$, namely $MV^2a/RL$, is transmitted via pin 31 to roller 34 to channel 33 and thence to the wheels through torque tubes 102, torque arms 103 and strut hubs 37, 38 and bars 35, 36. The result of this system of forces and suspension geometry is that the rear wheels are subjected to a lateral force whose sum is equal to the centrifugal force component $MV^2a/RL$ plus an overturning couple $$\frac{MV^2a\left(c+\frac{b}{2}\right)}{RL}.$$

The lateral force is equilibrated by the tire-to-ground friction forces whose sum at the two wheels is equal to centrifugal force $MV^2a/RL$. The overturning couple is balanced by the forces of bars 35, 36, whose torque on channel member 33 and torque tube base 104 is transmitted as vertical forces on torque arms 103. The vertical force on the inboard end of each torque arm is transmitted to the outboard end to a pinned, and grommeted joint 105 at strut hubs 37, 38.

The necessity for two separate and independent torque tubes at the suspensions becomes apparent when one considers the effect of a vertical displacement D of one wheel. The displacement of the torque arm 103 and its connected torque tube end (102)$a$ is also equal to D, since the torque tube will not permit rotation of the torque arm 103. But the displacement of the (102)$b$ end of the torque tube is equal substantially to $\frac{1}{2}$D. This is accomodated by the torque tube universal joints that allow (102)$a$ to move "D" units while (102)$b$ moves D/2 units.

Simultaneously, the (102)$b$ ends of the other torque tube has a displacement D/2 while the (102)$a$ end has zero displacement since the torque tube does not permit rotation of the torque arm. These displacements are accomodated by the universal joints at the second torque tube.

The torque tube and torque arm assembly at the front suspension is similar to that of the rear suspension described above.

Thus the objects of this invention have been accomplished of:
1. Eliminating vehicle body rollout in sharp turns without hydraulic power actuators.
2. Eliminating vehicle body rollout in sharp turns without the use of stiff anti-roll tursion bars.
3. Permitting the use of softer body support springs with no adverse effect on body rollout.

While preferred embodiments of this invention have been disclosed herein, many modifications thereof are possible within the scope of the disclosed invention. One such modification, for example, involves a roll axis B—B, as shown in FIG. 1, on a horizontal plane through the center of gravity of the sprung mass, with said plane parallel to the centrifugal force vector through said center of gravity. Other such possible axis planes through said center of gravity may be positioned at various intermediate angles between aces A—A and B—B.

Still another modification involves an axis C—C, as shown in FIG. 1, with said axis lying in a plane intersecting the center of gravity of the sprung mass, with said plane parallel to the centrifugal force vector through said center of gravity, and with said plane having an angular orientation clockwise with respect to axis B—B, as opposed to the counterclockwise orientation of axis A—A with respect to axis B—B.

This invention is not to be restricted except to the extent necessitated by prior art.

Thus it will be seen that I have provided a highly efficient and practical vehicle suspension which can be used in all types of vehicles for highly improving their ride, particularly when turning.

While I have illustrated and described several embodiments of my invention, it will be understood that they are by way of illustration only and that various changes and other modifications are contemplated by my invention within the scope of the following claims.

I claim:

1. In a vehicle comprising sprung and unsprung masses supported on axles having wheels, the combination of struts and support springs for the weight of the sprung mass, an axis defined by pivots between said sprung and unsprung masses, with a front pivot approximately midway between said wheels and near the vertical and horizontal planes through the front axles, with a rear pivot lying in an axis through the front pivot and in a plane through the center of gravity of said sprung mass, with said plane parallel to the centrifugal force vector through the center of gravity of said sprung mass, and with said rear pivot positioned approximately midway between the rear wheels, means for transmitting the centrifugal force component on the front pivot to the front wheels and ground comprising control bars oriented substantially parallel to the axles and rotatably joined at their outer ends to a wheel steering knuckle assembly through a ball joint with said control bars for right and left wheels being independently pivoted and joined, the centrifugal force transmitting means including two separate and independent torque tubes attached to one end through universal joints to a pivot bracket and at the other end through universal joints to torque arms joined at their outboard ends to the said lateral control bars, and longitudinal tie rods between the vehicle frame and the outer ends of said control bars or wheel struts, and means for transmitting the centrifugal force component on the rear pivot to the rear wheels and ground.

2. In the vehicle of claim 1 wherein said means for transmitting th centrifugal force component on the rear pivot to the rear wheels and ground, comprising a pair of horizontal lateral control bars forming a distortable parallelogram with pinned joints at strut clamping members at the wheels, a vertical channel member rotatably joined approximately to the midpoint of said control bars and extending upwardly to and guided by the rear pivot said rear pivot mounted on approximately the midpoint of a cross member of the vehicle frame and on said axis with the centrifugal force transmitting means including two separate and independent torque tubes attached at one end through universal joints to said vertical channel member and attached at the other end through universal joints to torque arms joined at their outboard ends to the said clamp members supporting the wheel struts.

3. In a vehicle consisting of sprung and unsprung masses, the combination of struts and support springs for the weight of the sprung mass, an axis defined by pivots between sprung and unsprung masses, with the pivots lying in a substantially horizontal plane intersecting the center of gravity of the sprung mass, with said plane parallel to the centrifugal force vector through the center of gravity of the sprung mass, with the front pivot lying in an approximately vertical plane intersecting the front axles, and with the rear pivot lying in an approximately vertical plane intersecting the rear axles, means for transmitting the centrifugal force component on the front pivot to the front wheels and ground, said means comprising lateral control members and associated separate and independent torque tubes and torque arms, and longitudinal tie rods between the vehicle frame and said lateral control members and means for transmitting the centrifugal force component on the rear pivot to the rear wheels and ground.

4. In a vehicle comprising sprung and unsprung masses, the combination of struts and support springs for the weight of the sprung mass, an axis defined by pivots between sprung and unsprung masses said pivots lying in a plane, intersecting the center of gravity of the sprung mass, with said plane orientation inclined clockwise from a horizontal orientation, and with said plane parallel to a centrifugal force vector through the center of gravity of the sprung mass, with the front pivot lying in an approximately vertical plane intersecting the front axles, and with the rear pivot lying in an approximately vertical plane intersecting the rear axles, means for transmitting the centrifugal force component on the front pivot to the front wheels and ground, said means comprising lateral control members and associated separate and independent torque tubes and torque arms, and longitudinal tie rods between the vehicle frame and said lateral control members, and means for transmitting the centrifugal force component on the rear pivot to the rear wheels and ground.

5. In a vehicle comprising sprung and unsprung masses, the combination of struts and support springs for the weight of sprung mass, an axis defined by pivots between the sprung and unsprung masses, said pivots lying in a plane intersecting the center of gravity of said sprung mass, said plane orientation inclined counterclockwise from a horizontal orientation, said plane being parallel to the centrifugal force vector through the center of gravity of the sprung mass, said front pivot lying in an approximately vertical plane intersecting the front axles, and said rear pivot lying in an approximately vertical plane intersecting the rear axles, means for transmitting the centrifugal force component on the front pivot to the front wheels and ground, said means comprising lateral control members and associated separate and independent torque tubes and torque arms, and longitudinal tie rods between the vehicle frame and said lateral control members, and means for transmitting the centrifugal force component on the rear pivot to the rear wheels and ground.

* * * * *